US008448157B2

(12) United States Patent
Mitran et al.

(10) Patent No.: US 8,448,157 B2
(45) Date of Patent: May 21, 2013

(54) ELIMINATING REDUNDANT OPERATIONS FOR COMMON PROPERTIES USING SHARED REAL REGISTERS

(75) Inventors: Marcel Mitran, Markham (CA); Kishor V. Patil, Toronto (CA); Joran S. C. Siu, Markham (CA); Mark G. Stoodley, Markham (CA); Vijay Sundaresan, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/912,045

(22) Filed: Oct. 26, 2010

(65) Prior Publication Data

US 2011/0107068 A1 May 5, 2011

(30) Foreign Application Priority Data

Oct. 30, 2009 (CA) ..................................... 2684226

(51) Int. Cl.
*G06F 9/45* (2006.01)
(52) U.S. Cl.
USPC ............................ 717/151; 717/155; 717/159
(58) Field of Classification Search
None
See application file for complete search history.

(56) References Cited

U.S. PATENT DOCUMENTS

| 4,571,678 | A | * | 2/1986 | Chaitin | 717/156 |
|---|---|---|---|---|---|
| 5,367,684 | A | * | 11/1994 | Smith | 717/140 |
| 5,537,620 | A | * | 7/1996 | Breternitz, Jr. | 717/160 |
| 5,659,754 | A | * | 8/1997 | Grove et al. | 717/158 |
| 6,072,952 | A | * | 6/2000 | Janakiraman | 717/155 |
| 6,090,156 | A | * | 7/2000 | MacLeod | 717/157 |
| 6,128,775 | A | * | 10/2000 | Chow et al. | 717/156 |
| 6,237,076 | B1 | | 5/2001 | Gaertner et al. | |
| 7,681,187 | B2 | * | 3/2010 | Ludwig et al. | 717/151 |
| 2003/0237080 | A1 | * | 12/2003 | Thompson et al. | 717/161 |
| 2004/0205739 | A1 | * | 10/2004 | Haber et al. | 717/151 |
| 2007/0294489 | A1 | | 12/2007 | Brenner | |
| 2009/0125893 | A1 | * | 5/2009 | Copeland et al. | 717/151 |

OTHER PUBLICATIONS

Park, Jinpyo and Moon, Soo-Mook, Optomistic Register Coalescing, [Online] Jul. 2004, ACM Transactions on Programming Languages and Systems, vol. 26, [Retrived from the Internet] <http://delivery.acm.org/10.1145/1020000/1011512/p735-park.pdf>.*
Bernstein et al., Spill code minimization technigues for optimizing compilers, [Online] 1989, PLDI '89 Proceedings of the ACM SIGPLAN 1989 Conference on Programming language design and implementation, [Retrieved from the Internet] <http://delivery.acm.org/10.1145/80000/74841/p258-bernstein.pdf>.*

(Continued)

*Primary Examiner* — Thuy Dao
*Assistant Examiner* — Ravi K Sinha
(74) *Attorney, Agent, or Firm* — Law Office of Jim Boice

(57) ABSTRACT

One embodiment of a method for eliminating redundant operations establishing common properties includes identifying a first virtual register storing a first value having a common property. The method may assign the first virtual register to use a real register. The method may further identify a second virtual register storing a second value also having the common property. The method may assign the second virtual register to use the same real register after the first value is no longer live. As a result of assigning the second virtual register to the first real register, the method may eliminate an operation configured to establish the common property for the second virtual register since this operation is redundant and is no longer needed.

18 Claims, 10 Drawing Sheets

OTHER PUBLICATIONS

G. J. Chaitin, Register Allocation & Spilling Via Graph Coloring, [Online] 1982, ACM, [Retrieved from the Internet] <http://delivery.acm.org/10.1145/810000/806984/p98-chaitin.pdf>.*

Munehiro, Takimoto, "Applying Partial Redundancy Elimination to Instruction Scheduling", IEIC Technical Report (Institute of Electronics, Information and Communication Engineers), 2006, vol. 106, pp. 1-6, Japan.

Munchnick, S. "Advanced Compiler Design and Implementation", Morgan Kaufmann, 1997, pp. 378-396, 407-415, 447-453.

Morel, E., and C. Renvoise. "Global Optimization by Suppression of Partial Redundancies", CACM, vol. 22, No. 2, Feb. 1979, pp. 96-103.

Tallam, S. and R. Gupta, "Bitwidth Aware Global Register Allocation", 30th Annual ACM SIGPLAN-SIGACT Symposium on Principles of Programming Languages, New Orleans, LA, Jan. 2003, pp. 85-96.

Li, B., Y. Zhang, and R. Gupta, "Speculative Subword Register Allocation in Embedded Processors", The 17th International Workshop on Languages and Compilers for Parallel Computing, LNCS 3602, Springer Verlag, West Lafayette, Indiana, Sep. 2004, pp. 56-71.

Barik, R., C. Grothoff, R. Gupta, V. Pandit, and R. Udupa, "Optimal bitwise register allocation using integer linear programming", International Workshop on Languages and Compilers for Parallel Computing (LCPC'06), 2006.

Kawahito, M., H. Komatsu, and T. Nakatani, "Effective sign extension elimination for java", ACM Transactions on Programming Languages and Systems (TOPLAS) vol. 28, Issue 1 (Jan. 2006) pp. 106-133.

* cited by examiner

Example 2

800

BB$_1$:    $v_1$ = set_upper_word_to_C()
          $v_1$ = E$_1$
          $v_x$ = Ex($v_1$)

BB$_2$:    Lloop:
                if (cond)
                    goto LElse

BB$_3$:    $v_2$ = set_upper_word_to_C()
          $v_2$ = E$_2$
          $v_3$ = set_upper_word_to_C()
          $v_3$ = E$_3$
          $v_y$ = Ey ($v_2$,$v_3$)
          *goto* LFinal BB$_4$:    LElse:
                $v_4$ = set_upper_word_to_C()
                $v_4$ = E$_4$ BB$_5$:    LFinal:
          $v_5$ = Φ($v_2$,$v_4$)
          if (cond($v_5$))
                goto Lloop BB$_6$:    Ldone:

BB$_1$:   $v_1[r_1]$ = set_upper_word_to_C()
    $v_1[r_1]$ = E$_1$
    $v_x[r_2]$ = Ex($v_1[r_1]$)

BB$_2$:   Lloop:
     if (cond)
      goto LElse

BB$_3$:   $v_2[r_1]$ = set_upper_word_to_C()
    $v_2[r_1]$ = E$_2$
    $v_3[r_2]$ = set_upper_word_to_C()
    $v_3[r_2]$ = E$_3$
    $v_y[r_2]$ = Ey ($v_2[r_1], v_3[r_2]$)
    *goto* LFinal BB$_4$:   LElse:
     $v_4[r_1]$ = set_upper_word_to_C()
     $v_4[r_1]$ = E$_4$ BB$_5$:   LFinal:
    $v_5[r_1]$ = Φ($v_2[r_1], v_4[r_1]$)
    if (cond($v_5[r_1]$))
     *goto* Lloop BB$_6$:   Ldone:

Fig. 10

ELIMINATING REDUNDANT OPERATIONS FOR COMMON PROPERTIES USING SHARED REAL REGISTERS

CROSS-REFERENCE TO RELATED APPLICATIONS

Pursuant to 35 U.S.C. 119, Applicant claims a right of priority to Canadian Patent Application No. 2684226 filed 30 Oct. 2009.

BACKGROUND

This invention relates to compiler optimization and, more particularly, to apparatus and methods for eliminating redundant operations establishing common properties using shared real registers.

Compiler optimization is the process of adjusting the output of a compiler to minimize or maximize some attribute of a computer program. A compiler, for example, may be optimized to minimize the execution time of a computer program, minimize the amount of memory used by a computer program, or minimize the amount of power consumed by a computer program as it executes on a machine. Decisions about which optimizations can and should be performed on program code may be tailored to the features and characteristics of a particular machine. The scope of optimizations may vary and may affect anything from a single statement to an entire program.

When compiling program code, the compiler is typically responsible for assigning the relatively large number of program variables (i.e., "virtual registers") to a smaller number of real registers in a CPU or other processor. This process is often referred to as "register allocation." Since accessing operands in real registers is significantly faster than accessing operands in memory, the compiler may be configured to keep as many operands as possible in real registers. This will minimize the number of times the computer program has to fetch operands from memory, thereby reducing the execution time of the computer program. Unfortunately, conventional compilers may not take advantage of various optimizations that may be possible when allocating variables to real registers. In particular, conventional compilers may not take advantage of optimizations that are possible when variables share common properties, such as common sets of bits.

SUMMARY

The invention has been developed in response to the present state of the art and, in particular, in response to the problems in the art that have not yet been solved. Accordingly, the invention has been developed to, among other things, eliminate redundant operations that establish common properties in program variables. The features and advantages of the invention will become more apparent from the following description and appended claims, or may be learned by practice of the invention as set forth hereinafter.

Consistent with the foregoing, a method for eliminating redundant operations establishing common properties is disclosed herein. In one embodiment, such a method may include identifying a first virtual register storing a first value having a common property. The method may assign the first virtual register to use a real register. The method may further identify a second virtual register storing a second value also having the common property. The method may assign the second virtual register to use the real register after the first value is no longer live. As a result of assigning the second virtual register to the first real register, the method may eliminate an operation configured to establish the common property for the second value since this operation is redundant and is no longer needed. A corresponding apparatus is also disclosed and claimed.

According to another embodiment of the present invention, a method comprises determining a plurality of virtual registers of a program that share a common property, where the program comprises a plurality of basic blocks and associated with each one of the basic blocks is an in-state and an out-state. For each one of the basic blocks, initializing the corresponding out-state to comprise a set of real registers of a data processing system, where the set of real registers comprise a real register for each virtual register in the corresponding basic block. For each one of the basic blocks, determining which ones of the plurality of basic blocks comprise predecessor blocks, and setting the corresponding in-state equal to an intersection of the predecessor blocks. For each one of the basic blocks, allocating each one of the virtual registers to one of the real registers. And, eliminating from a first one of the basic blocks a redundant program operation that establishes the common property if, upon entry into the first one of the basic blocks, a first real register already holds the common property. A corresponding computer program product is also disclosed and claimed.

BRIEF DESCRIPTION OF THE SEVERAL VIEWS OF THE DRAWINGS

In order that the advantages of the invention will be readily understood, a more particular description of the invention briefly described above will be rendered by reference to specific embodiments illustrated in the appended drawings. With the understanding that these drawings depict only typical embodiments of the invention and are not to be considered limiting of its scope, the embodiments of the invention will be described and explained with additional specificity and detail through use of the accompanying drawings, in which:

FIG. 8 is a second example of program code used to illustrate the method of FIG. 1;

FIG. 10 shows the program code of FIG. 8 with real registers allocated to each of the variables contained therein;

DETAILED DESCRIPTION

Figure 1:
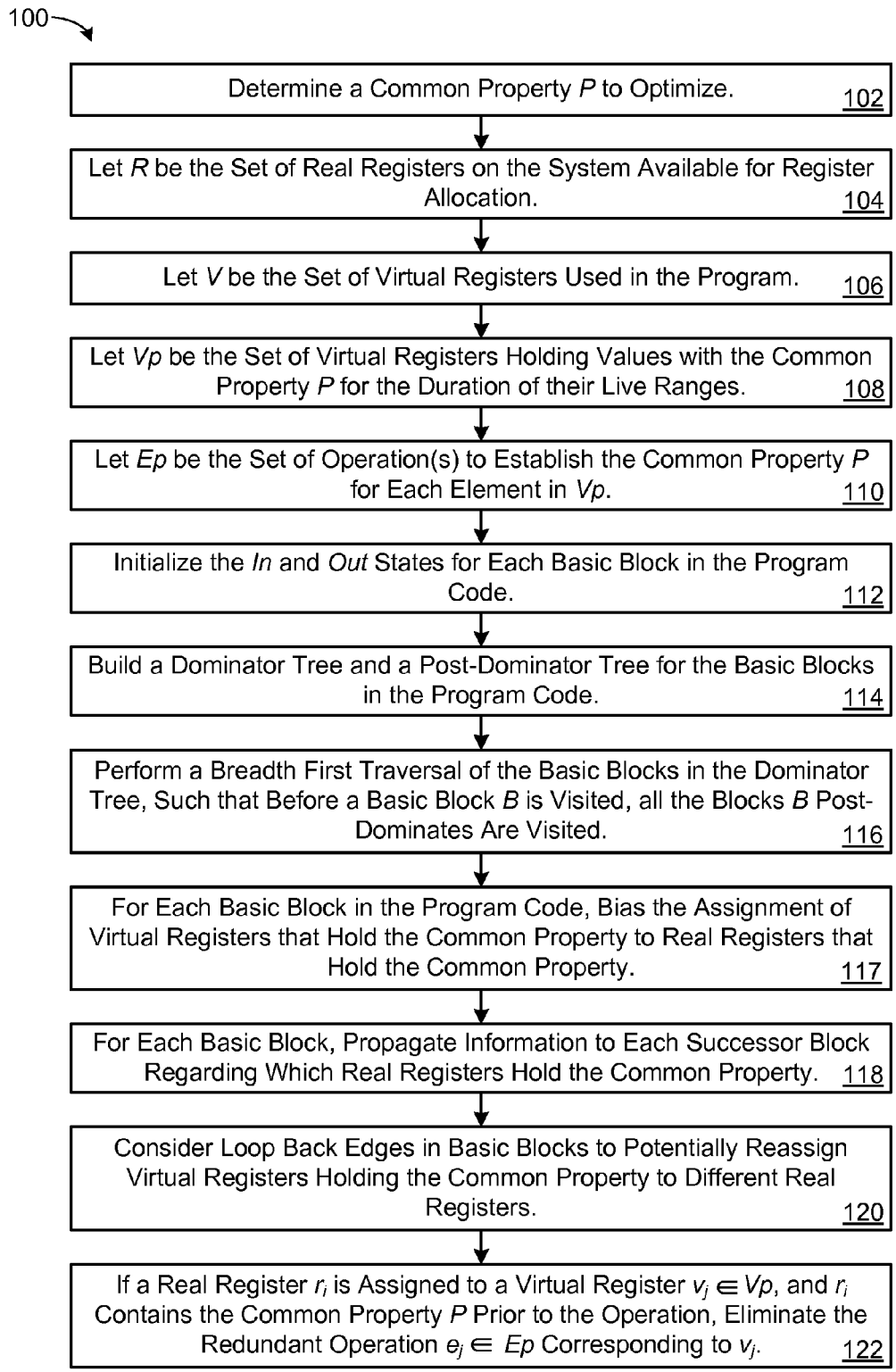
FIG. 1 is a flow diagram showing one embodiment of a method for eliminating redundant operations establishing common properties in program variables.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, certain aspects of the invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, certain aspects of the invention may take the form of a computer program product embodied in any tangible medium of expression having computer-usable program code stored in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store or transport the program for use by or in connection with an instruction execution system, apparatus or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and/or block diagrams of processes, apparatus, systems and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions that implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram block or blocks.

Referring to FIG. 1, one embodiment of a method 100 for eliminating redundant operations establishing common properties in program variables is illustrated. In general, the method 100 may be considered to include two phases: (1) a local phase, which biases the assignment of virtual registers to real registers within a basic block; and (2) a global phase, which propagates information about which real registers hold the common property across basic blocks.

For performance reasons, the method 100 may not perform a full dataflow analysis. Rather, the method 100 may perform local register assignment for basic blocks in the order of their position in a dominator tree. The method 100 may allocate registers for a dominating block first and then propagate information about which real registers hold the common property to successor blocks.

As will be explained in more detail hereafter, the method 100 may provide special consideration to loop back edges. More specifically, the method 100 may, after initial register allocation, modify a basic block's register assignment by considering values propagated from the block's loop back edge. The method 100 may traverse and allocate registers for each basic block only once. The method 100 may perform an additional pass through the basic block to reassign registers (if required by a loop back edge) and remove redundant instructions. As a result, the resources required to execute the method 100 are linear in relation to the number of basic blocks.

As illustrated in FIG. 1, the method 100 may initially determine 102 a common property P to optimize. For example, as stated previously, the common property P may be a common set of bits shared by variables in a program. For instance, a common property for 32-bit non-negative expressions is that the upper 32 bits are always zero when the values are zero-extended to 64 bits. That is, the upper 32 bits are always zero regardless of the value of the lower 32 bits. A zero-extension operation is typically performed to convert a 32-bit non-negative expression to a 64-bit value. Other common properties are also possible and within the scope of the invention.

The method 100 may, in certain embodiments, make the following assumptions 104, 106, 108, 110 for use in subsequent steps. In particular, the method 100 may assume that R is the set of real registers on the system (e.g., a CPU or other processor of a data processing system) that are available for register allocation; V is the set of virtual registers (i.e., variables) used in the program; Vp is the set of virtual registers holding values with the common property P for the duration of their live ranges; and Ep is the set of operations to establish the common property P for each element in Vp. As an example, where the common property P for a of set virtual registers is that upper 32 bits are always zero, the set of operations Ep may include the sign extension operation that extends a 32-bit non-negative value to 64 bits. Other operations that place zeros in the upper 32 bits may also be included in the set Ep.

For each basic block in the program, the method 100 may keep track of two states for global dataflow propagation—an in state and an out state. Each state consists of a set of real registers assumed to hold the common property P at corresponding entry or exit points of the basic block. The method 100 may initialize 112 the in and out states for each basic block in the program code.

For example, in selected embodiments, the method 100 may initialize 112 the out state to be a set of real registers with a size (i.e., cardinality) equal to the maximum number of live virtual registers that hold the common property P at any point in the basic block. The selection of the real registers in the set may be biased to real registers likely to hold the common property P. Similarly, the method 100 may initialize 112 the in state to be the intersection of the out states of all predecessor blocks. In certain embodiments, the in state of the first basic block in the dominator tree may correspond to a set of parameter registers containing the common property P.

The method 100 may build 114 a dominator tree and a post-dominator tree for basic blocks in the program code. The method 100 may then perform 116 a breadth first traversal of the basic blocks in the dominator tree, such that before a basic block B is visited, all blocks B post dominates are visited. As this traversal occurs, for each basic block, the method 100 may bias 117 the assignment of virtual registers that hold the common property to real registers that hold the common property. This step 117 generally corresponds to the local phase discussed above and will be explained in more detail in association with FIG. 2.

For each basic block, the method 100 may propagate 118 information to each successor block regarding which real registers hold the common property. This step 118 generally corresponds to the global phase discussed above. For example, upon assigning a basic block's virtual registers holding the common property to real registers holding the common property, the method 100 may update the out state of the basic block to reflect the real registers that hold the common property. This information may be used by the next basic block in the chain so that it knows which real registers hold the common property, and thus which virtual registers it should assign to these real registers.

As previously mentioned, the method 100 may consider 120 loop back edges in basic blocks to potentially reassign virtual registers holding the common property to different real registers. That is, after initial register allocation, the method 100 may modify a basic block's register assignment by considering the real register assignments propagated from the block's loop back edge. This step 120 will be discussed in more detail in association with FIG. 3.

Once the assignment of virtual registers that hold the common property to real registers that hold the common property is settled, the method 100 may eliminate 122 one or more redundant operations that establish the common property. In other words, if a real register $r_i$ is assigned to a virtual register $v_j$ (belonging to the set Vp), and $r_i$ contains the common property P prior to an operation $e_j$ that establishes the common property, the method 100 may eliminate 122 the redundant operation $e_j$ (belonging to the set Ep). The elimination of such redundant instructions will reduce the execution time of the compiled computer program.

In certain embodiments, a further optimization may be performed for loops. In general, instructions to establish the common property P should be done in the loop pre-header blocks. If the limiting out state in the intersection calculation is the loop pre-header's out state, then instructions to establish the common property P may be inserted into the loop pre-header block to maximize the number of real registers available for the loop body.

Figure 2:
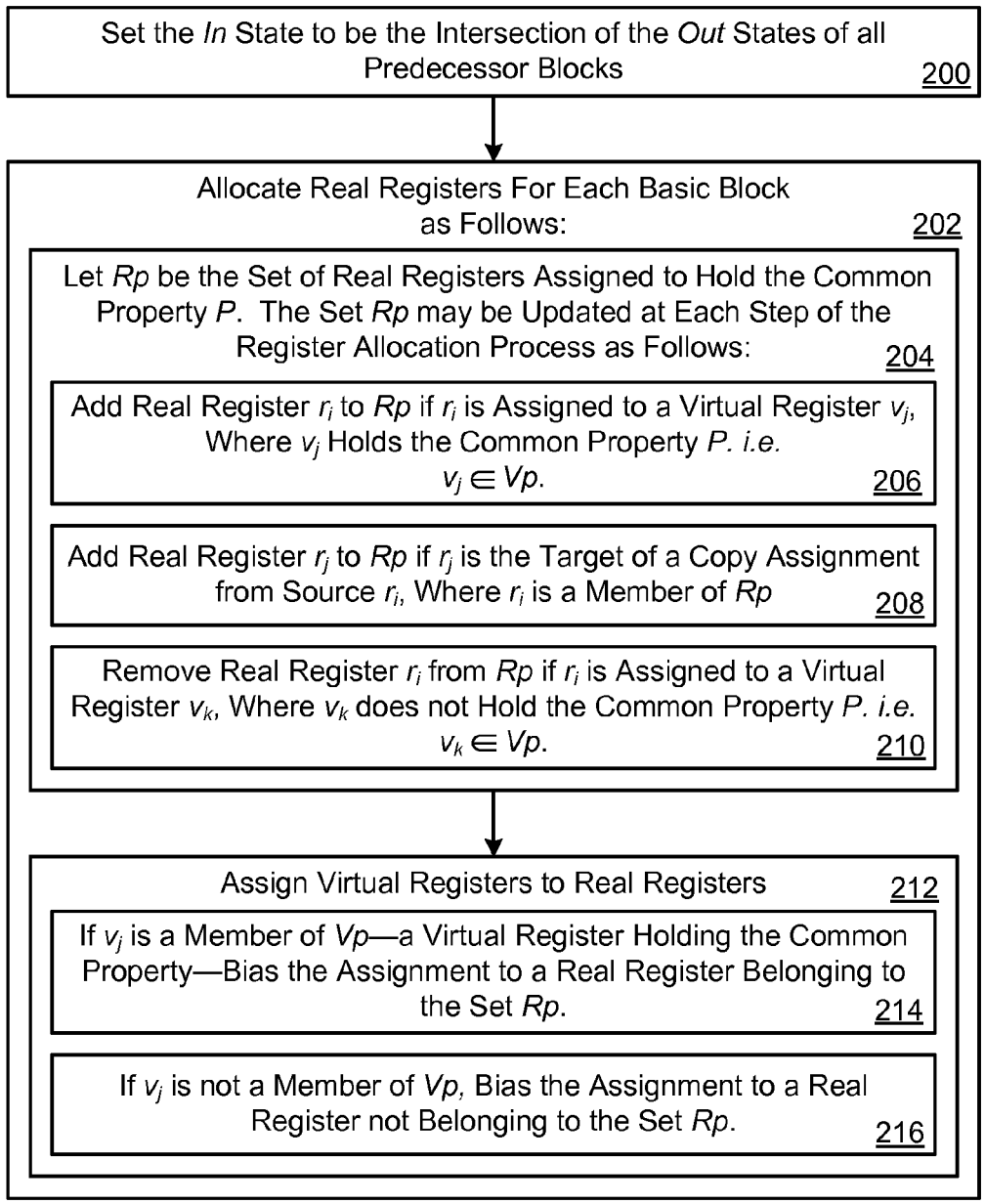
FIG. 2 is a flow chart showing one example of a method for assigning virtual registers that hold a common property to real registers that hold the common property.

Referring to FIG. 2, one embodiment of a method 117 for assigning virtual registers that hold the common property to real registers that hold the common property is illustrated. As shown, for a basic block, the method 117 may initially set 200 the in state to be the intersection of the out states of all predecessor blocks. The method 117 may then proceed to allocate 202 real registers for the basic block.

In certain embodiments, the allocation step 202 may be accomplished as follows. First, the method 117 may assume 204 that Rp is the set of real registers assigned to hold the common property P. The set Rp may be updated at each step of the register allocation process as follows: First, the method 117 may add 206 a real register $r_i$ to Rp if $r_i$ is assigned to a virtual register $v_j$ that holds the common property P. Second, the method 117 may add 208 a real register $r_j$ to Rp if $r_j$ is the target of a copy assignment from a source real register $r_i$, where $r_i$ holds the common property P (is a member of Rp). Third, the method 117 may remove 210 a real register $r_i$ from Rp if $r_i$ is assigned to a virtual register $v_k$ that does not hold the common property P.

Next, the method 117 may assign 212 the virtual registers of the basic block to real registers as follows: If $v_j$ is a member of Vp (i.e., $v_j$ is a virtual register holding the common property P), the method 117 may bias 214 the assignment of $v_j$ to a real register that holds the common property P (a real register that is a member of Rp). On the other hand, if $v_j$ is not a member of Vp (i.e., $v_j$ is a virtual register that does not hold the common property P), the method 117 may bias 216 the assignment of $v_j$ to a real register that does not hold the common property P (a real register that is not a member of Rp).

Figure 3:
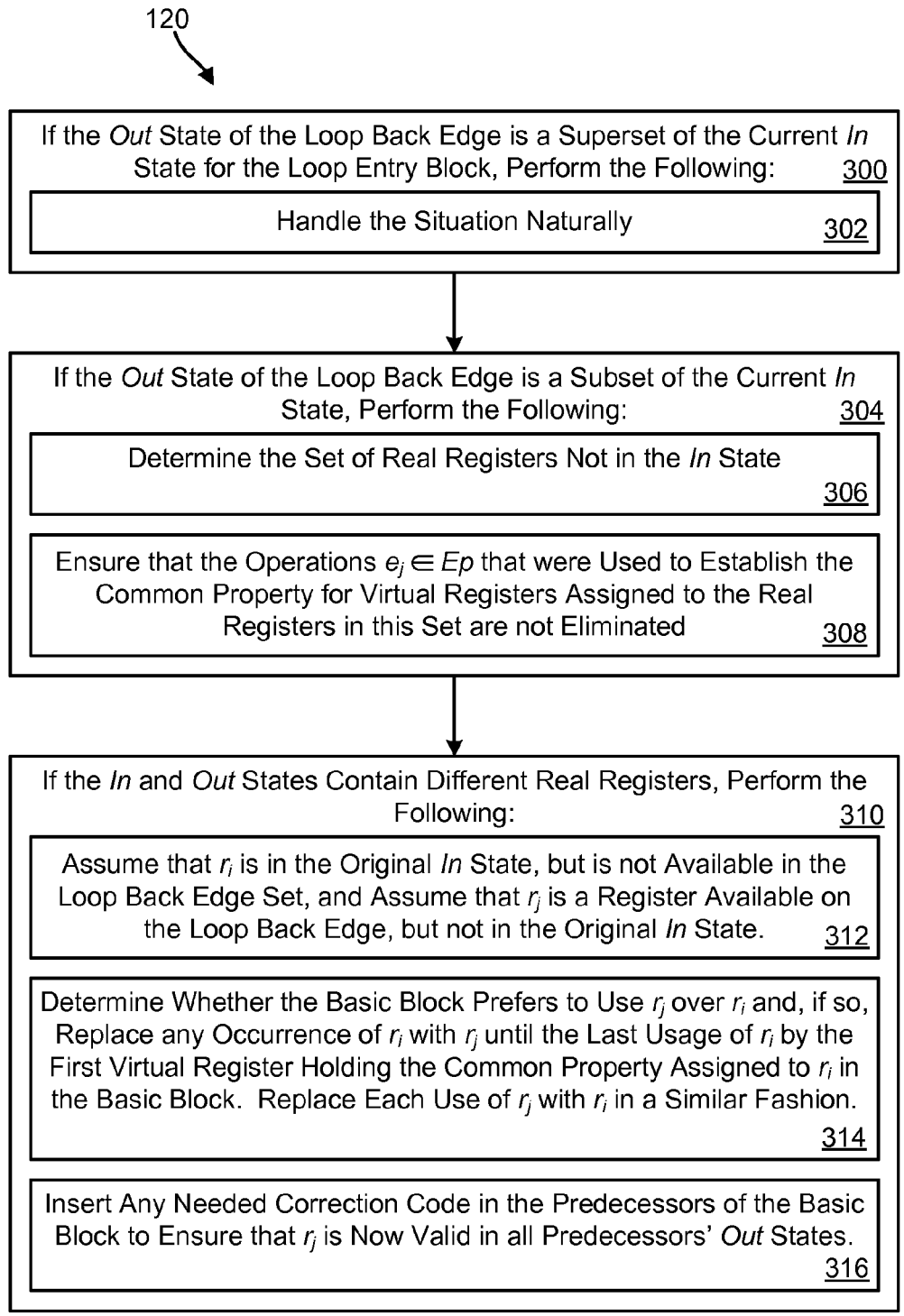
FIG. 3 is a flow chart showing one example of a method for considering loop back edges in a computer program.

Referring to FIG. 3, one embodiment of a method 120 for considering loop back edges is illustrated. In general, the method 120 may modify a basic block's register assignment by considering real register assignments propagated from the block's loop back edge. For example, for loop entry basic blocks, the in state may change based on data from the loop back edge. Given the dominator tree order, when register allocation is performed for a loop entry basic block, the actual out state of the block's loop back edge is not yet determined. The method 120 may be used to address three possible scenarios once the out state of the loop back edge is considered.

First, if the out state of the loop back edge is the same as or is a superset of the current in state (condition 300), the method 120 may handle 302 the situation naturally (i.e., do nothing differently). This is because, in this scenario, the out state from the loop back edge does nothing to change the assumptions that were made about the basic block's in state. Stated otherwise, the intersection of the out state with the in state results in the same in state for which register allocation was initially performed.

Second, if the out state of the loop back edge is a subset of the current in state (condition 304), the method 120 may proceed to determine 306 which real registers are in the basic block's in state but are not in the loop back edge's out state. The method 120 may then ensure 308 that operations that were used to establish the common property for virtual registers assigned to these real registers are not eliminated 308 from the program code.

Third, if the in state for the basic block and the out state of the loop back edge contain different real registers (condition 310), the method 120 may modify the real registers that are contained in the basic block's in state. For example, assume 312 that $r_i$ is in the original in state of the basic block but is not available in the out state of the loop back edge. Further assume 312 that $r_j$ is a register that is available in the out state of the loop back edge but is not in the basic block's original in state. The method 120 may determine 314 whether the basic block prefers to use $r_j$ over $r_i$ and, if so, replace any occurrence of $r_i$ with $r_j$ until the last usage of $r_i$ by the first virtual register holding the common property assigned to $r_i$ in the basic block. The method 120 may replace 314 each use of $r_j$ with $r_i$ in a similar fashion. Finally, the method 120 may insert 316 any needed correction code in the basic blocks that are predecessors of the basic block to ensure that $r_j$ is now valid in all of the predecessors' out states.

In certain embodiments, if the out state of the loop back edge is a superset of the current in state (condition 300), the method 120 may be implemented so as to increase the number of real registers holding the common property in blocks that execute within a loop. Such an embodiment may place operations in each of a set of predecessor blocks to a loop entry block (other than a loop back edge predecessor block) that would establish the common property for a real register in the loop back edge predecessor's out state and not in the loop entry block's current in state. If these operations to establish the common property on the real register are inserted at the end of each predecessor block in the set, then the set of real registers that hold the common property at the beginning of the loop entry block will be increased. To take advantage of the larger set of real registers that hold the common property, register assignment could then be performed again in all of the blocks within the loop as well as the predecessor blocks, or register assignment could be updated in the blocks of the loop to use the real registers that previously did not hold the common property when the blocks were first processed, but now hold the common property through insertion of the new operations.

The determination of the set of real registers for which to make such changes would preferably weigh the cost of the inserted operations in the predecessor blocks versus the benefit of eliminating operations to establish the common property for a real register in a loop block. The determination may also take into account the additional time required to reassign registers in the loop blocks. Although the example above specifically addresses the intersection of the out states of predecessors to a loop entry block, alternate embodiments may follow the same process for the intersection of the out states of predecessor blocks for any kind of basic block. If a real register has the common property in the out state for some predecessor blocks but not all predecessor blocks, then the method may not insert operations to establish the common property for real registers in predecessor blocks that already hold the common property.

The method 100 illustrated in FIG. 1 and described in more detail in FIG. 2 and FIG. 3 will be illustrated using several concrete examples provided in FIG. 4 through FIG. 11. The first example will be discussed in association with FIG. 4 through FIG. 7. The second example with be discussed in association with FIG. 8 through FIG. 11. These examples are provided only by way of example and are not intended to be limiting.

Figure 4:
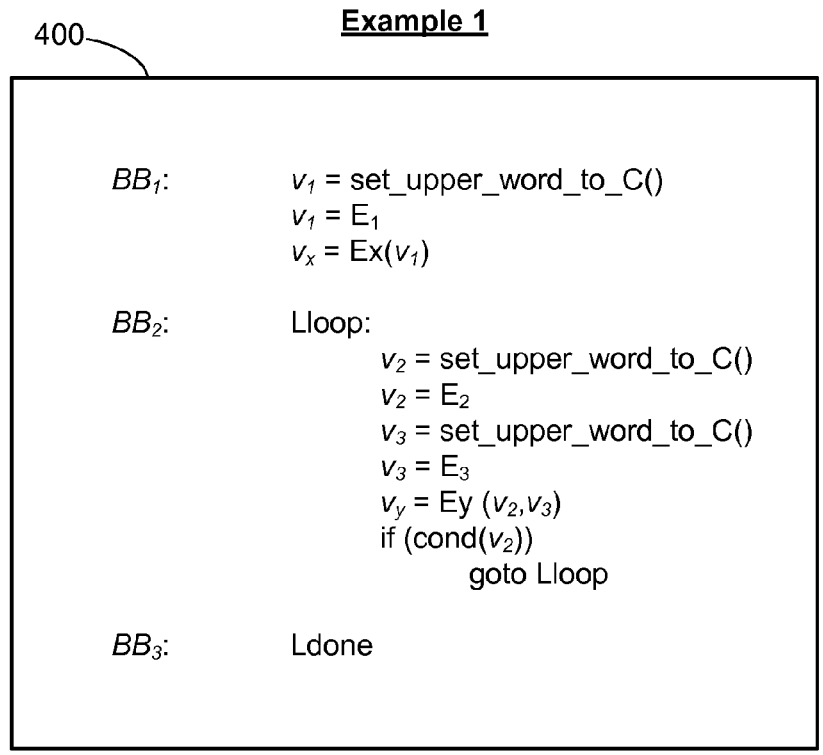
FIG. 4 is a first example of program code used to illustrate the method of FIG. 1.

Referring to FIG. 4, a first example of program code 400 is provided to illustrate the method of FIG. 1. As shown, the program code 400 includes three basic blocks ($BB_1$, $BB_2$ and $BB_3$) with a natural loop consisting of basic block $BB_2$. In this example, the common property P is that the upper 32-bit words of the 64-bit expressions $E_1$, $E_2$, and $E_3$ contain a constant C, while the upper 32-bit words of the 64-bit expressions Ex and Ey do not. In this example, the set of real registers R consists of $\{r_1, r_2\}$. The set of virtual registers V consists of $\{v_1, v_2, v_3, v_x, v_y\}$. The set of virtual registers Vp holding values with the common property P for the duration of their live range is $\{v_1, v_2, v_3\}$. The set of instructions Ep establishing the common property P for the set Vp is: $\{v_1=\text{set\_upper\_word\_to\_C()}, v_2=\text{set\_upper\_word\_to\_C()}, \text{and } v_3=\text{set\_upper\_word\_to\_C()}\}$.

The method 100 may initialize 112 the in states for $BB_1$, $BB_2$, and $BB_3$ to the empty set as follows:

|     | In state | Out state |
| --- | --- | --- |
| $BB_1$ | { } |  |
| $BB_2$ | { } |  |
| $BB_3$ | { } |  |

The method 100 may then initialize 112 the out states for $BB_1$, $BB_2$, and $BB_3$. This may be accomplished, for example, by determining the maximum number of virtual registers holding the common property P live at any point in the basic blocks. The method 100 may then set the out states based on this information as follows:

|     | In state | Out state |
| --- | --- | --- |
| $BB_1$ | { } | $\{r_1\}$ |
| $BB_2$ | { } | $\{r_1, r_2\}$ |
| $BB_3$ | { } | { } |

The method 100 may then update the in states by taking the intersection of the out states of all predecessor blocks (the global phase). For example, the two predecessor blocks of $BB_2$ are $BB_1$, with an out state of $\{r_1\}$, and $BB_2$, with an out state of $\{r_1, r_2\}$. Thus, the in state for $BB_2$ becomes $\{r_1\}$ and the in state for $BB_3$ becomes $\{r_1, r_2\}$ as follows:

|     | In state | Out state |
| --- | --- | --- |
| $BB_1$ | { } | $\{r_1\}$ |
| $BB_2$ | $\{r_1\}$ | $\{r_1, r_2\}$ |
| $BB_3$ | $\{r_1, r_2\}$ | { } |

Figures 5A, 5B:
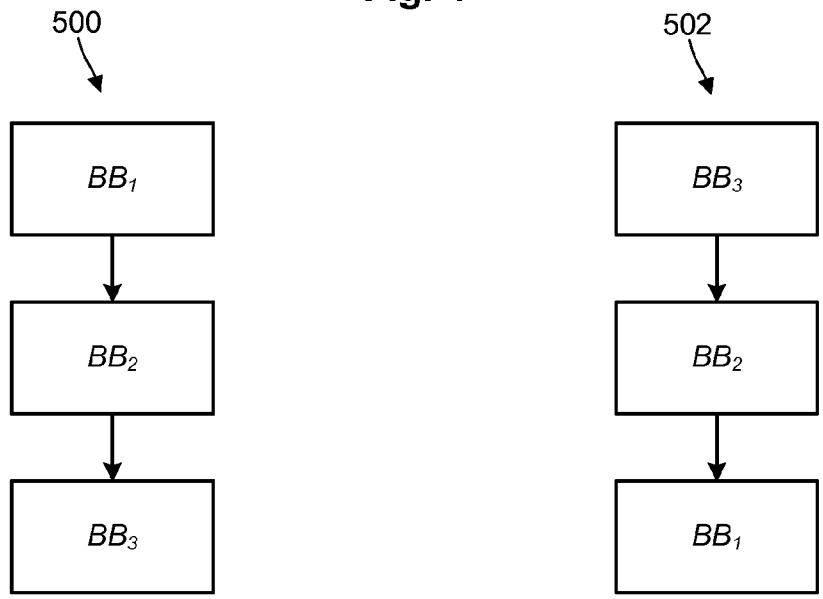
FIG. 5A is a dominator tree for the program code illustrated in FIG. 4.
FIG. 5B is a post-dominator tree for the program code illustrated in FIG. 4.

The dominator tree 500 and post-dominator tree 502 for the program code 400 are illustrated in FIG. 5A and FIG. 5B, respectively. As previously mentioned, the order in which real registers will be allocated for the basic blocks is based on a breadth-first traversal of the basic blocks in the dominator tree, such that before a basic block B is visited, all blocks B post dominates are visited. In this example, register allocation will be performed for the basic blocks in the following order: $BB_1 \rightarrow BB_2 \rightarrow BB_3$.

Real registers may then be allocated for each basic block. In doing so, the assignment of virtual registers that hold the common property will be biased to real registers that hold the common property. This will ideally allow one or more redundant operations to be eliminated. To allocate real registers for $BB_1$, the method 100 may consider the in and out states for $BB_1$. The virtual register $v_1$, for example, may be assigned to real register $r_1$. The virtual register $v_x$, which does not contain the common property P, may be assigned to a real register other than $r_1$, in this example real register $r_2$. As a result, the out state for $BB_1$ will become $\{r_1\}$.

Real registers may then be allocated for $BB_2$. Because the real register $r_1$ will contain the common property P upon entry into $BB_2$, the virtual register $v_2$ may be assigned to real register $r_1$. Similarly, the virtual registers $v_3$ and $v_y$ may be assigned to real register $r_2$. Accordingly, the out state for $BB_2$ will become $\{r_1\}$.

Real registers may then be allocated for $BB_3$. Because $BB_3$ is an empty block, nothing is done for $BB_3$.

Figure 6:
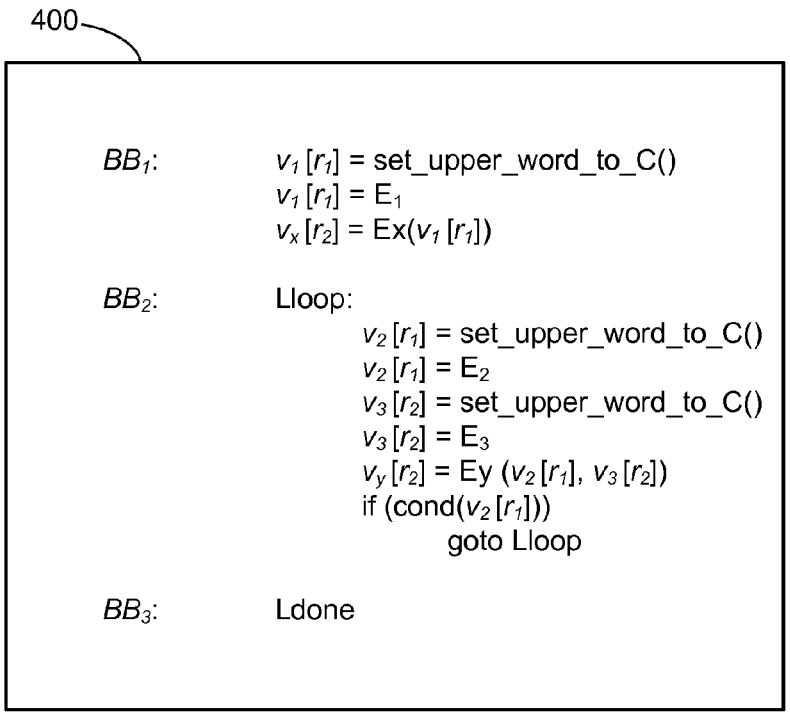
FIG. 6 shows the program code of FIG. 4 having real registers allocated for each of the variables contained therein.

The final state and real register allocation for the program code 400 illustrated in FIG. 4 is shown in FIG. 6. Real registers that are assigned to virtual registers are shown in brackets.

Loop back edges of the program code 400 may then be considered. In this example, a loop back edge ties the $BB_2$ out state to the $BB_2$ in state. Because the in state and out state for $BB_2$ are identical, nothing needs to be done to the real register assignments.

Figure 7:
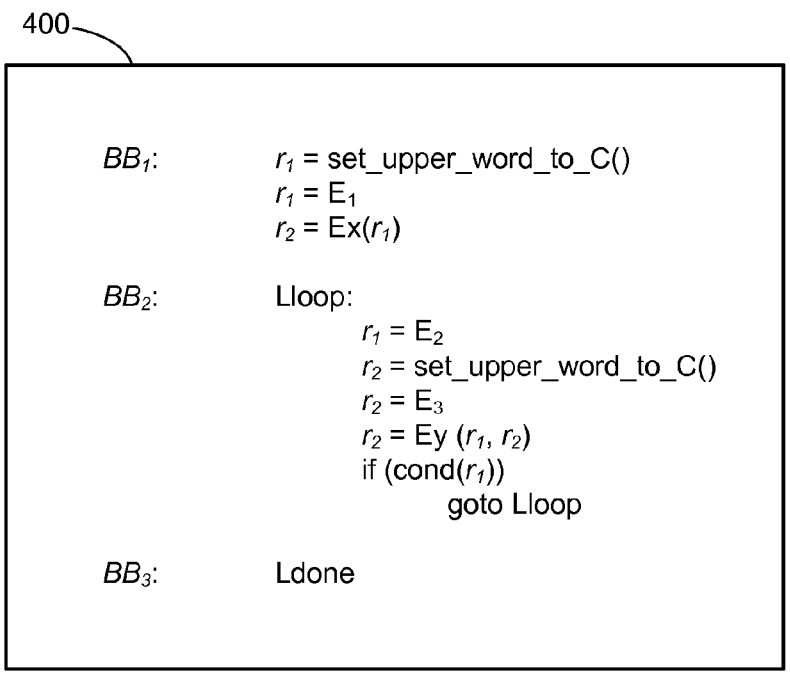
FIG. 7 shows the program code of FIG. 4 after the code has been optimized.

Finally, redundant operations that establish the common property P may be eliminated from the program code 400. Since real register $r_1$ contains the common property P upon entry to $BB_2$, the operation establishing the common property P for virtual register $v_2$ is redundant. Thus, the statement "$v_2[r_1]$=set_upper_word_to_C( )" may be removed from the program code 400. FIG. 7 shows the final program code 400 after the redundant statement is eliminated.

Referring to FIG. 8, a second example of program code 800 is provided to further illustrate the method of FIG. 1. As shown, the program code 800 includes six basic blocks ($BB_1$, $BB_2$, $BB_3$, $BB_4$, $BB_5$ and $BB_6$). The program code 800 includes an if-else-statement with a natural loop. In this example, the common property P is that the upper 32-bit words of the 64-bit expressions $E_1$, $E_2$, $E_3$, and $E_4$ contain a constant C, while expressions Ex and Ey do not. The $\Phi$ function used in $BB_5$ defines virtual register $v_5$ using either virtual register $v_2$ or $v_4$, depending on the block from which the control flow originated (i.e., $BB_3$ or $BB_4$). The set of real registers R consists of $\{r_1, r_2\}$. The set of virtual registers V consists of $\{v_1, v_2, v_3, v_4, v_5, v_x, v_y\}$. The set of virtual registers Vp holding values with the common property P for the duration of their live range is $\{v_1, v_2, v_3, v_4, v_5\}$. The set of instructions Ep establishing the common property P for the set Vp is: $\{v_1$=set_upper_word_to_C( ), $v_2$=set_upper_word_to_C( ), $v_3$=set_upper_word_to_C( ), and $v_4$=set_upper_word_to_C( )$\}$.

The method 100 may initialize 112 the in states for the basic blocks to the empty set as follows:

| | In state | Out state |
|---|---|---|
| $BB_1$ | { } | |
| $BB_2$ | { } | |
| $BB_3$ | { } | |
| $BB_4$ | { } | |
| $BB_5$ | { } | |
| $BB_6$ | { } | |

The method 100 may then initialize 112 the out states for the basic blocks by determining the maximum number of virtual registers that hold the common property P live at any point in the basic blocks. The method 100 may then set the out states as follows:

| | In state | Out state |
|---|---|---|
| $BB_1$ | { } | $\{r_1\}$ |
| $BB_2$ | { } | { } |
| $BB_3$ | { } | $\{r_1, r_2\}$ |
| $BB_4$ | { } | $\{r_1\}$ |
| $BB_5$ | { } | $\{r_1\}$ |
| $BB_6$ | { } | { } |

The method 100 may then set the in states by taking the intersection of the out states of all predecessor blocks. For example, the two predecessor blocks of $BB_5$ are $BB_3$, with an out state of $\{r_1, r_2\}$, and $BB_4$ with an out state of $\{r_1\}$. Thus, the in state for $BB_5$ becomes $\{r_1\}$ and the in state for $BB_2$ becomes $\{r_1\}$ as follows:

| | In state | Out state |
|---|---|---|
| $BB_1$ | { } | $\{r_1\}$ |
| $BB_2$ | $\{r_1\}$ | { } |
| $BB_3$ | { } | $\{r_1, r_2\}$ |
| $BB_4$ | { } | $\{r_1\}$ |
| $BB_5$ | $\{r_1\}$ | $\{r_1\}$ |
| $BB_6$ | { } | { } |

Figure 9A:
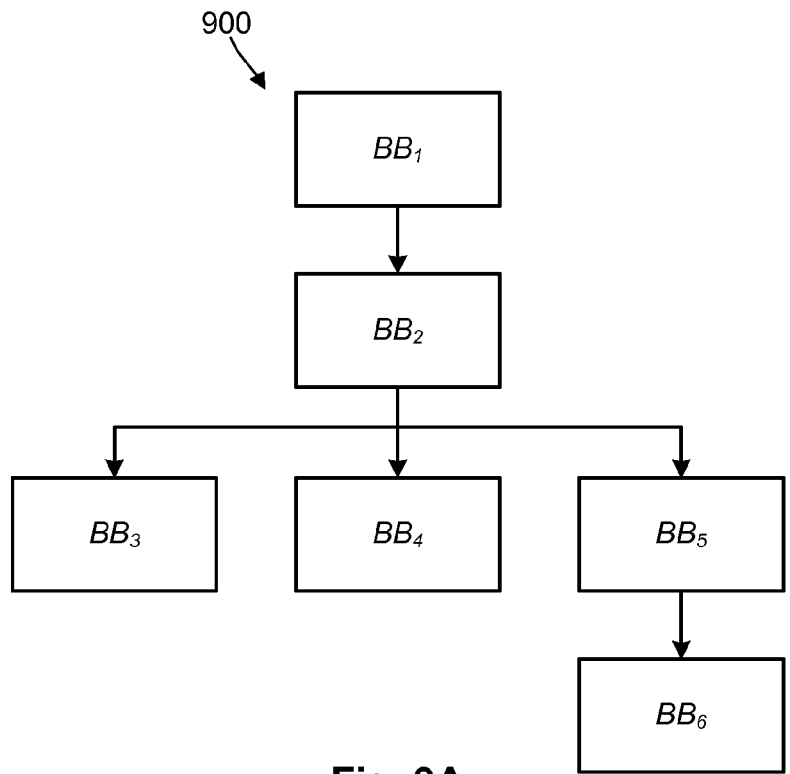
FIG. 9A is a dominator tree for the program code illustrated in FIG. 8.
Figure 9B:
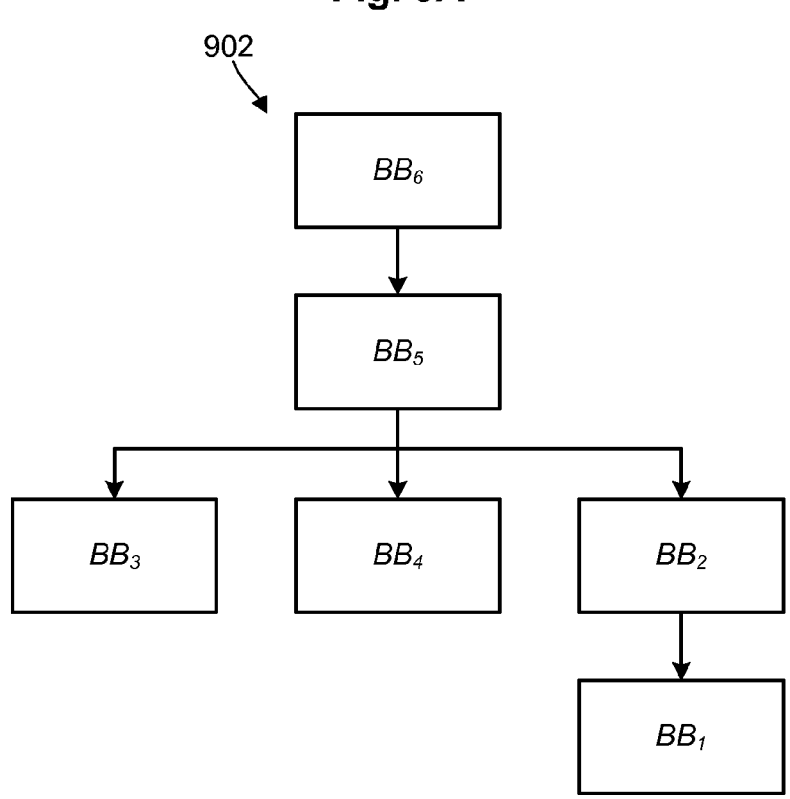
FIG. 9B is a post-dominator tree for the program code illustrated in FIG. 8.

The dominator tree 900 and post-dominator tree 902 for the program code 800 are illustrated in FIG. 9A and FIG. 9B, respectively. The order in which register allocation is performed is based on a breadth-first traversal of the basic blocks in the dominator tree, such that before a basic block B is visited, all blocks B post dominates are visited. In this example, register allocation will be performed for the basic blocks in the following order: $BB_1 \rightarrow BB_2 \rightarrow BB_3 \rightarrow BB_4 \rightarrow BB_5 \rightarrow BB_6$. The basic block $BB_5$ cannot be register allocated until both basic blocks $BB_3$ and $BB_4$ are register allocated.

Real registers may then be allocated for each basic block. To allocate real registers for $BB_1$, the in and out states for $BB_1$ may be considered. The virtual register $v_1$ may be assigned to real register $r_1$. The virtual register $v_x$, which does not contain the common property P, may be assigned to a real register other than $r_1$, in this example real register $r_2$. As a result, the out state for $BB_1$ will become $\{r_4\}$.

Real registers may then be allocated for $BB_2$. Because the real register $r_1$ will contain the common property P upon entry into $BB_2$, which has no virtual registers to assign, the real register $r_1$ will contain the common property P upon exit from $BB_2$. Accordingly, the out state for $BB_2$ will be $\{r_1\}$.

Real registers may then be allocated for $BB_3$. Because the real register $r_1$ will contain the common property P upon entry into $BB_3$, the virtual register $v_2$ may be assigned to real register $r_1$. Similarly, the virtual registers $v_3$ and $v_y$ may be assigned to real register $r_2$. Because $v_y$ is the last virtual register in real register $r_2$ upon exit, the out state for $BB_3$ will be $\{r_1\}$.

Real registers may then be allocated for $BB_4$. Because the real register $r_1$ will contain the common property P upon entry into $BB_4$, the virtual register $v_4$ may be assigned to real register $r_1$. Thus, the out state for $BB_4$ will be $\{r_1\}$.

Real registers may then be allocated for $BB_5$. The $\Phi$ function used in $BB_5$ calculates the virtual register $v_5$ using either virtual register $v_2$ or $v_4$, depending on the block the control flow originated from (i.e., $BB_3$ or $BB_4$). In this case, both virtual registers $v_2$ and $v_4$ are assigned to real register $r_1$, so virtual register $v_5$ may also be assigned to real register $r_1$. Since both virtual registers $v_2$ and $v_4$ hold the common property P, $v_5$ will also hold the common property. Hence, real register $r_1$ will contain the common property P upon exit. Accordingly, the out state for $BB_5$ will be $\{r_1\}$.

Real registers may then be allocated for $BB_6$. Because $BB_6$ is an empty block, nothing is done for $BB_6$.

The final state and real register allocation for the program code 800 illustrated in FIG. 8 is shown in FIG. 10. Real registers that are assigned to virtual registers are shown in brackets.

Loop back edges of the program code 800 may then be considered. In this example, the loop back edge ties the $BB_5$ out state to the $BB_2$ in state. Because the in state and out state for $BB_2$ are identical, nothing needs to be done to modify the real register assignments.

Figure 11:
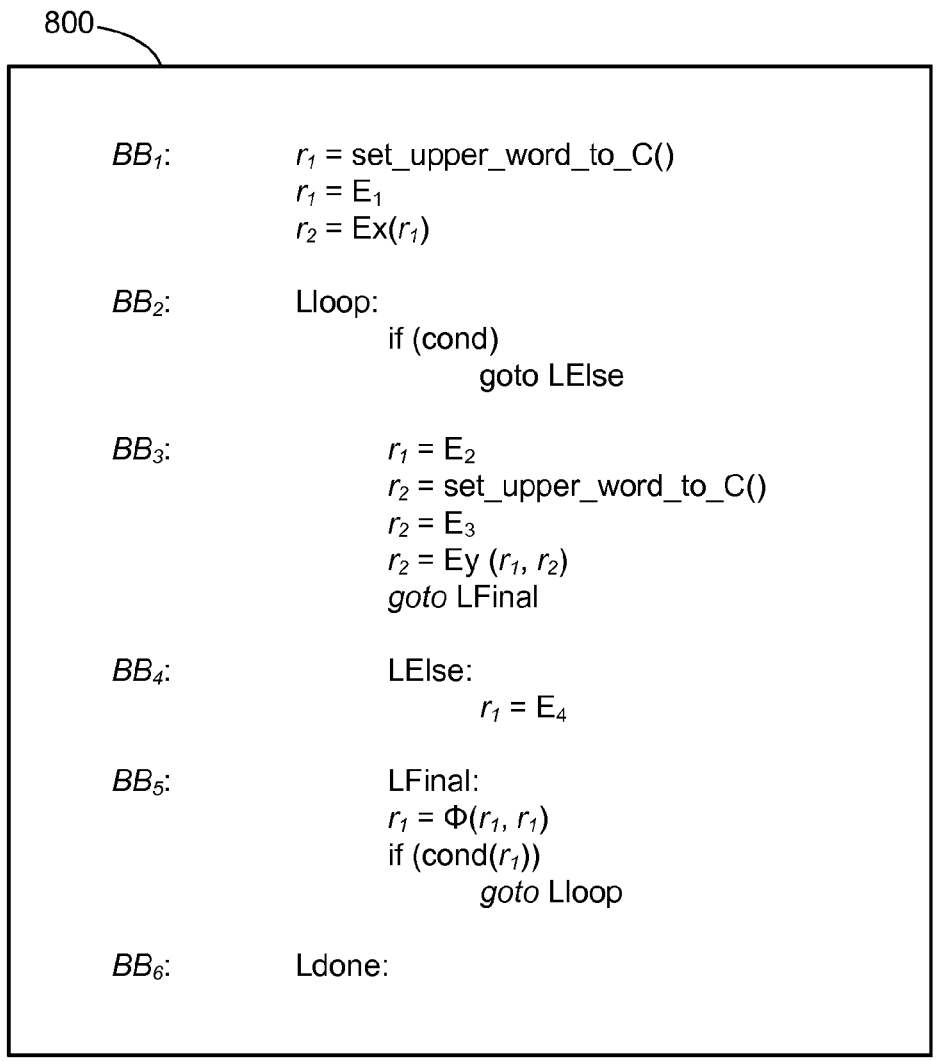
FIG. 11 shows the program code of FIG. 8 after the code has been optimized.

Finally, redundant operations that establish the common property P may be eliminated from the program code 800. Since real register $r_1$ contains the common property P upon entry to $BB_3$ and $BB_4$, the operations establishing the common property P for virtual registers $v_2$ and $v_4$ are redundant. Thus, the statements "$v_2[r_1]$=set_upper_word_to_C( )" and "$v_4[r_1]$=set_upper_word_to_C( )" may be eliminated from the program code 800. FIG. 11 shows the final program code 800 after the redundant statements are eliminated.

Figure 12:
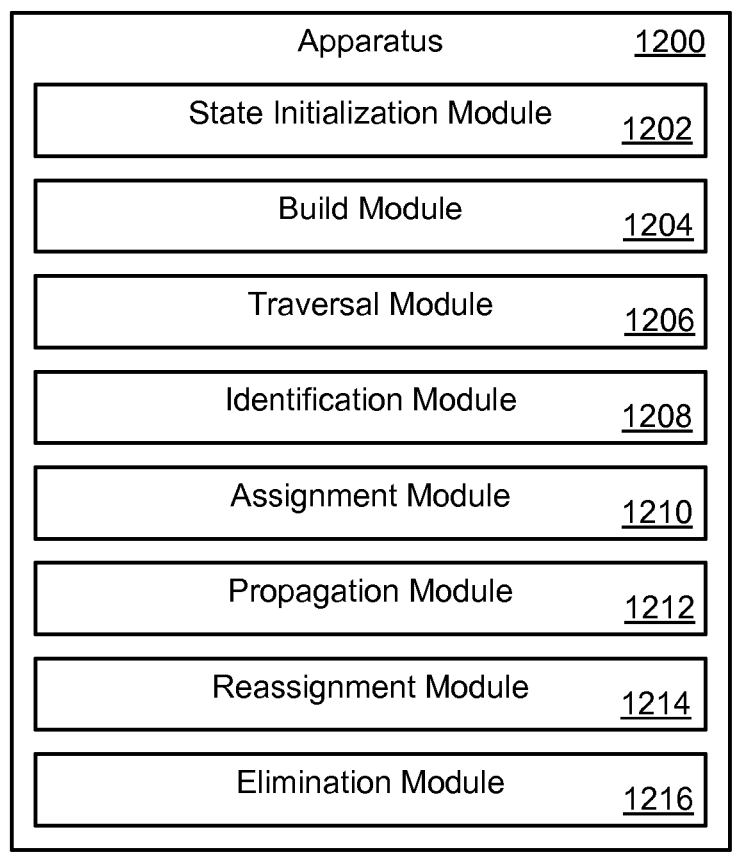
FIG. 12 is a high-level block diagram showing various modules that may be included in an apparatus in accordance with the invention.

Referring to FIG. 12, at a very high level, an apparatus 1200 in accordance with the invention may include one or more modules to implement the functionality described in FIG. 1 through FIG. 3. These modules may be embodied in hardware, software configured to operate hardware, firmware configured to operate hardware, or a combination thereof. In selected embodiments, these modules may include one or more of a state initialization module 1202, a build module 1204, a traversal module 1206, an identification module 1208, an assignment module 1210, a propagation module 1212, a reassignment module 1214, and an elimination module 1216, among other modules. These modules are presented only by way of example and are not intended to limiting. Certain embodiments of the invention may include more or fewer modules than those illustrated.

In certain embodiments, the state initialization module 1202 may be used to initialize the in and out states for each basic block in the program code, as previously discussed. For example, the state initialization module 1202 may initialize the out state for a basic block to be a set of real registers with a size equal to the maximum number of live virtual registers that hold the common property P at any point in the basic block. The state initialization module 1202 may initialize the in state to be the intersection of the out states of all predecessor blocks.

The build module 1204 may build a dominator tree and a post-dominator tree for basic blocks in the program code. A traversal module 1206 may traverse these tree structures. For example, the traversal module 1206 may perform a breadth first traversal of the basic blocks in the dominator tree, such that before a basic block B is visited, all blocks B post dominates are visited.

As the traversal module 1206 traverses the basic blocks in the program code, an identification module 1208 may identify virtual registers in each basic block that hold a common property P. An assignment module 1210 may assign, where possible, the virtual registers that hold the common property to real registers that hold the common property. As real register assignments are made for each basic block, a propagation module 1212 may propagate information about which real registers hold the common property across basic blocks (the global phase). For example, the propagation module 1212 may update the out states for each basic block so that information concerning which real registers hold the common property may be propagated to the next basic block or blocks in the chain.

A reassignment module 1214 may, in certain embodiments, be used to consider loop back edges in the program code. For example, the reassignment module 1214 may, after initial register allocation, modify a basic block's register assignment by considering the out state propagated from the block's loop back edge. Finally, once the real registers assignments are settled, an elimination module 1216 may eliminate one or more redundant operations from the program code that establish the common property, thereby optimizing the program code that is being compiled.

The flowchart and block diagrams in the Figures illustrate the architecture, functionality, and operation of possible implementations of systems, processes, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A method, comprising:
    determining a plurality of virtual registers of a program that share a common property, the program comprising a plurality of basic blocks, associated with each one of the basic blocks is an in-state and an out-state;
    for each one of the basic blocks, initializing the corresponding out-state to comprise a set of real registers of a data processing system, where the set of real registers comprise a real register for each virtual register in the corresponding basic block;
    for each one of the basic blocks, determining which ones of the plurality of basic blocks comprise predecessor blocks, and setting the corresponding in-state equal to an intersection of the predecessor blocks;
    for each one of the basic blocks, allocating each one of the virtual registers to one of the real registers; and
    eliminating from a first one of the basic blocks a redundant program operation that establishes the common property if, upon entry into the first one of the basic blocks, a first real register already holds the common property.

2. The method of claim 1, where allocating each one of the virtual registers to one of the real registers occurs in an order based on a dominator tree, breadth-first traversal of the basic blocks.

3. The method of claim 2, further comprising: for each one of the basic blocks, initializing the corresponding in-state to an empty set.

4. The method of claim 3, further comprising: inserting an operation into a first one of the basic blocks to cause a first one of the real registers to comprise the common value.

5. The method of claim 1, further comprising: for each one of the basic blocks, initializing the corresponding in-state to an empty set.

6. The method of claim 5, further comprising: inserting an operation into a first one of the basic blocks to cause a first one of the real registers to comprise the common value.

7. The method of claim 1, further comprising: inserting an operation into a first one of the basic blocks to cause a first one of the real registers to comprise the common value.

8. A computer program product comprising a non-transitory computer readable storage medium comprising computer readable program code embodied therewith, the computer readable program code comprising:
computer readable program code configured to determine a plurality of virtual registers of a program that share a common property, the program comprising a plurality of basic blocks, associated with each one of the basic blocks is an in-state and an out-state;
computer readable program code configured to, for each one of the basic blocks, initialize the corresponding out-state to comprise a set of real registers, where the set of real registers comprise a real register for each virtual register in the corresponding basic block;
computer readable program code configured to, for each one of the basic blocks, determine which ones of the plurality of basic blocks comprise predecessor blocks, and to set the corresponding in-state equal to an intersection of the predecessor blocks;
computer readable program code configured to, for each one of the basic blocks, allocate each one of the virtual registers to one of the real registers; and
computer readable program code configured to eliminate from a first one of the basic blocks a redundant program operation that establishes the common property if, upon entry into the first one of the basic blocks, a first real register already holds the common property.

9. The computer program product of claim 8, where the computer readable program code configured to allocate each one of the virtual registers to one of the real registers further comprises computer readable program code configured to allocate each one of the virtual registers to one of the real registers in an order based on a dominator tree, breadth-first traversal of the basic blocks.

10. The computer program product of claim 9, further comprising:
computer readable program code configured to, for each one of the basic blocks, initialize the corresponding in-state to an empty set.

11. The computer program product of claim 10, further comprising:
computer readable program code configured to insert an operation into a first one of the basic blocks to cause a first one of the real registers to comprise the common value.

12. The computer program product of claim 8, further comprising:
computer readable program code configured to, for each one of the basic blocks, initialize the corresponding in-state to an empty set.

13. The computer program product of claim 12, further comprising:
computer readable program code configured to insert an operation into a first one of the basic blocks to cause a first one of the real registers to comprise the common value.

14. The computer program product of claim 8, further comprising:
computer readable program code configured to insert an operation into a first one of the basic blocks to cause a first one of the real registers to comprise the common value.

15. A computer system comprising:
a processor, a computer readable memory, and a computer readable storage medium;
first program instructions to determine a plurality of virtual registers of a program that share a common property, the program comprising a plurality of basic blocks, associated with each one of the basic blocks is an in-state and an out-state;
second program instructions to, for each one of the basic blocks, initialize the corresponding out-state to comprise a set of real registers, where the set of real registers comprise a real register for each virtual register in the corresponding basic block;
third program instructions to, for each one of the basic blocks, determine which ones of the plurality of basic blocks comprise predecessor blocks, and to set the corresponding in-state equal to an intersection of the predecessor blocks;
fourth program instructions to, for each one of the basic blocks, allocate each one of the virtual registers to one of the real registers; and
fifth program instructions to eliminate from a first one of the basic blocks a redundant program operation that establishes the common property if, upon entry into the first one of the basic blocks, a first real register already holds the common property; and
wherein
the first, second, third, fourth, and fifth program instructions are stored on the computer readable storage medium for execution by the processor via the computer readable memory.

16. The computer system of claim 15, further comprising:
sixth program instructions to allocate each one of the virtual registers to one of the real registers in an order based on a dominator tree, breadth-first traversal of the basic blocks; and wherein
the sixth program instructions are stored on the computer readable storage medium for execution by the processor via the computer readable memory.

17. The computer system of claim 15, further comprising:
sixth program instructions to, for each one of the basic blocks, initialize the corresponding in-state to an empty set; and wherein
the sixth program instructions are stored on the computer readable storage medium for execution by the processor via the computer readable memory.

18. The computer system of claim 15, further comprising:
sixth program instructions to insert an operation into a first one of the basic blocks to cause a first one of the real registers to comprise the common value; and wherein
the sixth program instructions are stored on the computer readable storage medium for execution by the processor via the computer readable memory.

* * * * *